United States Patent
Lee et al.

(10) Patent No.: US 10,358,041 B2
(45) Date of Patent: Jul. 23, 2019

(54) ELECTRIC VEHICLE

(71) Applicants: HYUNDAI MOTOR COMPANY, Seoul (KR); KIA MOTORS CORPORATION, Seoul (KR)

(72) Inventors: Woo Young Lee, Yongin-si (KR); Gyu Yeong Choe, Suwon-si (KR); Jung Hong Joo, Suwon-si (KR); Dong Sup Ahn, Seoul (KR); Jin Hwan Jung, Suwon-si (KR); Byeong Seob Song, Yongin-si (KR); Sihun Yang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/833,678

(22) Filed: Dec. 6, 2017

(65) Prior Publication Data
US 2019/0023136 A1 Jan. 24, 2019

(30) Foreign Application Priority Data
Jul. 21, 2017 (KR) .................. 10-2017-0092450

(51) Int. Cl.
| B60L 15/00 | (2006.01) |
| B60L 15/04 | (2006.01) |
| B60L 11/18 | (2006.01) |
| H02P 27/06 | (2006.01) |
| H02J 7/00 | (2006.01) |
| B60L 53/14 | (2019.01) |
| B60L 53/22 | (2019.01) |

(Continued)

(52) U.S. Cl.
CPC .......... *B60L 11/1812* (2013.01); *B60L 53/11* (2019.02); *B60L 53/14* (2019.02); *B60L 53/22* (2019.02); *B60L 53/24* (2019.02); *H02J 7/0068* (2013.01); *H02P 27/06* (2013.01); *B60L 2210/14* (2013.01); *B60L 2210/40* (2013.01)

(58) Field of Classification Search
CPC combination set(s) only.
See application file for complete search history.

(56) References Cited

U.S. PATENT DOCUMENTS

| 5,157,319 | A | * | 10/1992 | Klontz | ................ B60L 11/1816 320/108 |
| 5,283,513 | A | * | 2/1994 | Fujita | .................. B60L 11/1816 307/10.1 |

(Continued)

FOREIGN PATENT DOCUMENTS

| JP | 2011-062072 A | 3/2011 |
| JP | 2013-085442 A | 5/2013 |
| KR | 2010-0005271 A | 1/2010 |

*Primary Examiner* — Bentsu Ro
(74) *Attorney, Agent, or Firm* — Morgan, Lewis & Bockius LLP

(57) ABSTRACT

An electric vehicle includes: a battery configured to be charged with a first voltage; and a converter configured to boost, when power of a second voltage that is lower than the first voltage is received, the power of the second voltage to the first voltage, and to transfer the first voltage to the battery, so that the battery is charged with power of the first voltage, wherein when the power of the first voltage is received, the power of the first voltage is transferred to the battery to charge the battery.

17 Claims, 18 Drawing Sheets

(51) Int. Cl.
*B60L 53/24* (2019.01)
*B60L 53/10* (2019.01)

(56) References Cited

U.S. PATENT DOCUMENTS

| | | | |
|---|---|---|---|
| 6,255,008 B1 * | 7/2001 | Iwase | B60L 11/1881 180/65.275 |
| 8,692,506 B2 * | 4/2014 | Saito | B60L 3/0046 320/103 |
| 2010/0076636 A1 | 3/2010 | Ichikawa | |
| 2012/0025763 A1 | 2/2012 | Hsiao et al. | |
| 2016/0016483 A1 | 1/2016 | Yasunori et al. | |
| 2016/0207403 A1 | 7/2016 | Iida et al. | |
| 2016/0214492 A1 | 7/2016 | Spesser | |

\* cited by examiner

FIG. 5
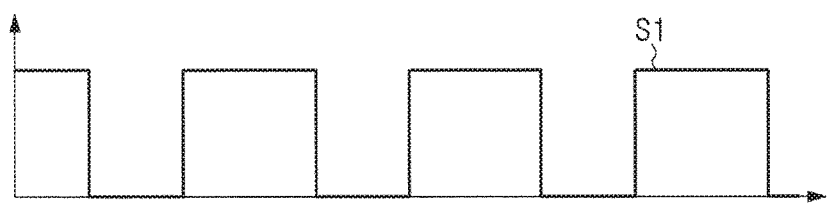
FIG.5A
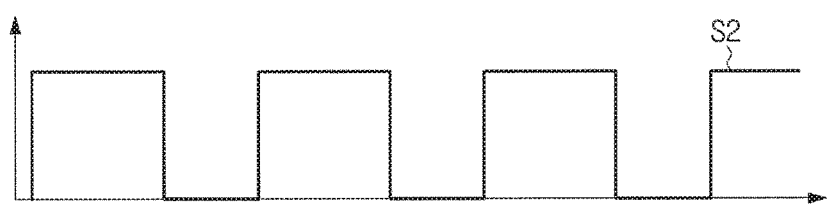
FIG.5B
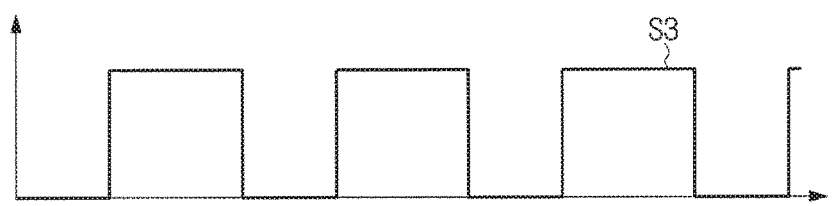
FIG.5C
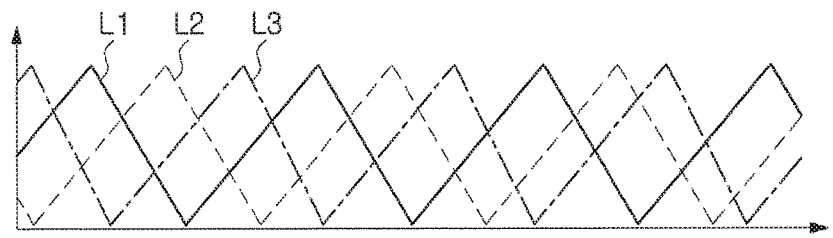
FIG.5D

FIG. 11
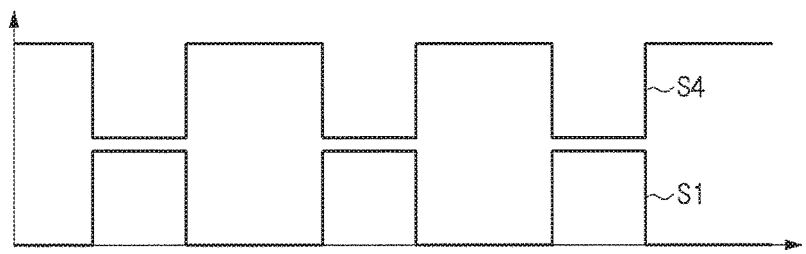
FIG. 11A
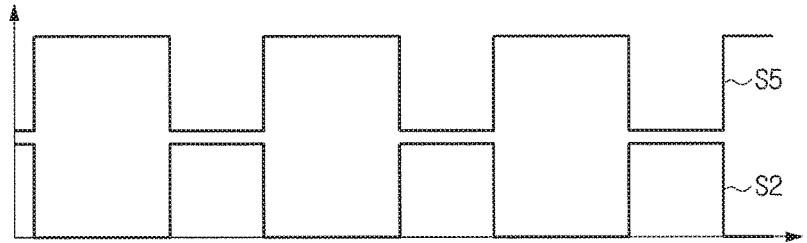
FIG. 11B
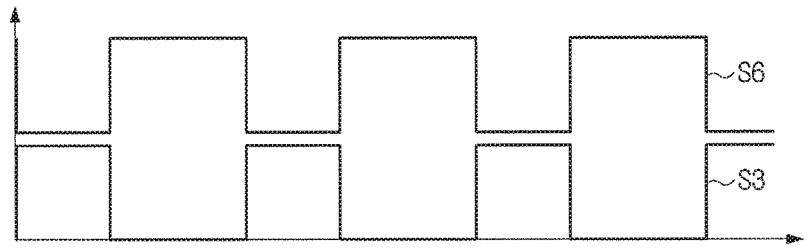
FIG. 11C
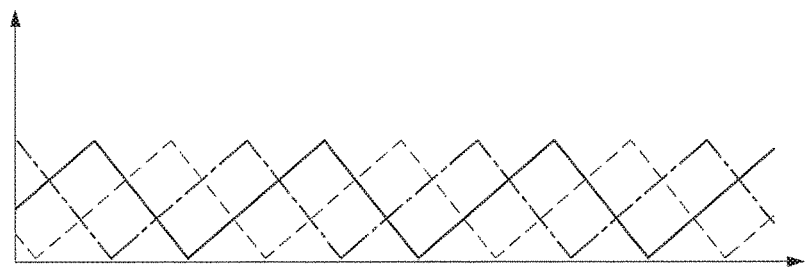
FIG. 11D

ELECTRIC VEHICLE

CROSS-REFERENCE TO RELATED APPLICATION

This application claims the benefit of priority to Korean Patent Application No. 10-2017-0092450, filed on Jul. 21, 2017 in the Korean Intellectual Property Office, the disclosure of which is incorporated herein by reference.

TECHNICAL FIELD

The present disclosure relates to a vehicle, and more particularly, to an electric vehicle of traveling using power of a motor.

BACKGROUND

An electric vehicle uses electrical energy as a main energy source, unlike an internal-combustion engine vehicle using fossil fuel as a main energy source. Accordingly, the electric vehicle essentially needs a high-voltage battery to store electrical energy, a motor as a power source, and an inverter to drive the motor. In order to increase a driving distance and efficiency of power consumption of the electric vehicle, use of a large-capacity battery is increasing. Further, efforts for increasing the efficiency of the inverter and the motor are actively conducted.

One of methods for improving the efficiency of the inverter and the motor is to raise a battery voltage. For example, doubling a battery voltage can reduce current flowing to the inverter and the motor to ½ to obtain the same output power since P=VI, and can reduce conduction loss ($I^2R$) to ¼. Accordingly, the efficiency of the inverter and the motor can increase by the amount of reduction of the conduction loss. If a power element and a conductor having high conduction resistance are used, the sizes of connection connectors connecting the battery, the inverter, and the motor, as well as the sizes of the inverter and the motor can be reduced, which leads to a reduction of cost.

However, increasing a battery voltage has one limitation. Most of commercialized rapid chargers charge batteries having a charging voltage of about 200V to 500V. Accordingly, a battery having a high charging voltage of 800V or more for high efficiency cannot be charged by typical rapid chargers that charge batteries having a charging voltage of 200V to 500V. That is, compatibility with the typical rapid chargers acts as a limiting factor in raising the battery voltage of the electric vehicle. For this reason, a rapid charger capable of outputting (charging) a high voltage should be developed and installed in order to raise the battery voltage of the electric vehicle.

SUMMARY

An aspect of the present disclosure provides a converter for converting power between a charger installed in a charging facility and a battery of an electric vehicle so as to achieve the compatibility between a rapid charger and a high-voltage battery.

Additional aspects of the disclosure will be set forth in part in the description which follows and, in part, will be obvious from the description, or may be learned by practice of the disclosure.

In accordance with one aspect of the present disclosure, an electric vehicle includes: a battery configured to be charged with a first voltage; and a converter configured to boost, when power of a second voltage that is lower than the first voltage is received, the power of the second voltage to the first voltage, and to transfer the first voltage to the battery so that the battery is charged with power of the first voltage, wherein when the power of the first voltage is received, the power of the first voltage is transferred to the battery to charge the battery.

The electric vehicle may further include a switch disposed at an input side of the converter, and configured to open or close a path through which the power of the second voltage received is transferred to the converter and the battery.

The switch includes: a first switch configured to be turned on when the power of the first voltage is received so that the power of the first voltage is transferred to the battery; and a second switch and a third switch configured to be turned on when the power of the second voltage is received so that the power of the second voltage is boosted by the converter and then transferred to the battery.

The switch includes: a diode configured to directly transfer the power of the first voltage received to the battery; and a second switch and a third switch configured to be turned on when the power of the second voltage is received so that the power of the second voltage is boosted by the converter and then transferred to the battery.

In the electric vehicle, the switch may be selectively turned on and off in a charging mode, and in a driving mode, the switch may be turned off.

The switch is disposed inside the converter.

The switch is disposed outside the converter.

In accordance with another aspect of the present disclosure, an electric vehicle includes: a battery configured to be charged with a first voltage; a motor configured to drive a driving wheel; and an inverter configured to convert power of the battery, and to provide the power of the battery to the motor, wherein when power of a second voltage that is lower than the first voltage is received, the motor and the inverter operate as a converter to boost the power of the second voltage to the first voltage, and to transfer the first voltage to the battery so that the battery is charged with power of the first voltage, and when power of the first voltage is received, the power of the first voltage is transferred to the battery so that the battery is charged with the power of the first voltage.

The electric vehicle further includes a switch configured to open or close a path through which the power of the second voltage received is transferred to the inverter and the motor.

The switch includes a first switch configured to be turned on when the power of the first voltage is received so that the power of the first voltage is transferred to the battery through the inverter; and a second switch and a third switch configured to be turned on when the power of the second voltage is received so that the power of the second voltage is boosted by the inverter and the motor and then transferred to the battery.

The switch includes a diode configured to transfer the power of the first voltage received to the inverter; and a second switch and a third switch configured to be turned on when the power of the second voltage is received so that the power of the second voltage is boosted by the inverter and the motor and then transferred to the battery.

In the electric vehicle, the switch may be selectively turned on and off in a charging mode, and in a driving mode, the switch may be turned off.

In accordance with another aspect of the present disclosure, an electric vehicle includes: a battery configured to be charged with a first voltage; a motor configured to drive a driving wheel; an inverter configured to convert power of the battery, and to provide the power of the battery to the motor; a switch configured to open or close a path through which power received is transferred to the inverter and the motor; and an external inductor configured to connect the switch to the motor, wherein when power of a second voltage that is lower than the first voltage is received, the motor and the inverter operate as a converter to boost the power of the second voltage to the first voltage, and to transfer the first voltage to the battery so that the battery is charged with power of the first voltage, and when power of the first voltage is received, the power of the first voltage is transferred to the battery so that the battery is charged with the power of the first voltage.

The switch includes a first switch configured to be turned on when the power of the first voltage is received so that the power of the first voltage is transferred to the battery through the inverter; and a second switch and a third switch configured to be turned on when the power of the second voltage is received so that the power of the second voltage is boosted by the inverter and the motor and then transferred to the battery.

The switch includes a diode configured to transfer the power of the first voltage received to the inverter; and a second switch and a third switch configured to be turned on when the power of the second voltage is received so that the power of the second voltage is boosted by the inverter and the motor and then transferred to the battery.

In the electric vehicle, the switch may be selectively turned on and off in a charging mode, and in a driving mode, the switch may be turned off.

The external inductor is connected to a neutral terminal of the motor.

In accordance with another aspect of the present disclosure, an electric vehicle includes: a battery configured to be charged with a first voltage; a motor configured to drive a driving wheel; an inverter configured to convert power of the battery, and to provide the power of the battery to the motor; and a switch disposed in the inverter to be integrated into the inverter, and configured to open or close a path through which power received is transferred to the inverter and the motor, wherein when power of a second voltage that is lower than the first voltage is received, the motor and the inverter operate as a converter to boost the power of the second voltage to the first voltage, and to transfer the first voltage to the battery so that the battery is charged with power of the first voltage, and when power of the first voltage is received, the power of the first voltage is transferred to the battery so that the battery is charged with the power of the first voltage.

In accordance with another aspect of the present disclosure, an electric vehicle includes: a battery configured to be charged with a first voltage; and a converter configured to boost, when power of a second voltage that is lower than the first voltage is received, the power of the second voltage to the first voltage, and to transfer the first voltage to the battery.

In accordance with another aspect of the present disclosure, an electric vehicle includes: a battery configured to be charged with a first voltage; a motor configured to drive a driving wheel; and an inverter configured to convert power of the battery, and to provide the power of the battery to the motor, wherein when power of a second voltage that is lower than the first voltage is received, the motor and the inverter operate as a converter to boost the power of the second voltage to the first voltage and to transfer the first voltage to the battery.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 5A-5D are graphs showing electrical characteristics of a converter according to an embodiment of the present disclosure.

FIGS. 11A-11D are graphs showing electrical characteristics of the motor 212 and the inverter 206 according to an embodiment of the present disclosure.

DETAILED DESCRIPTION

Figure 1:
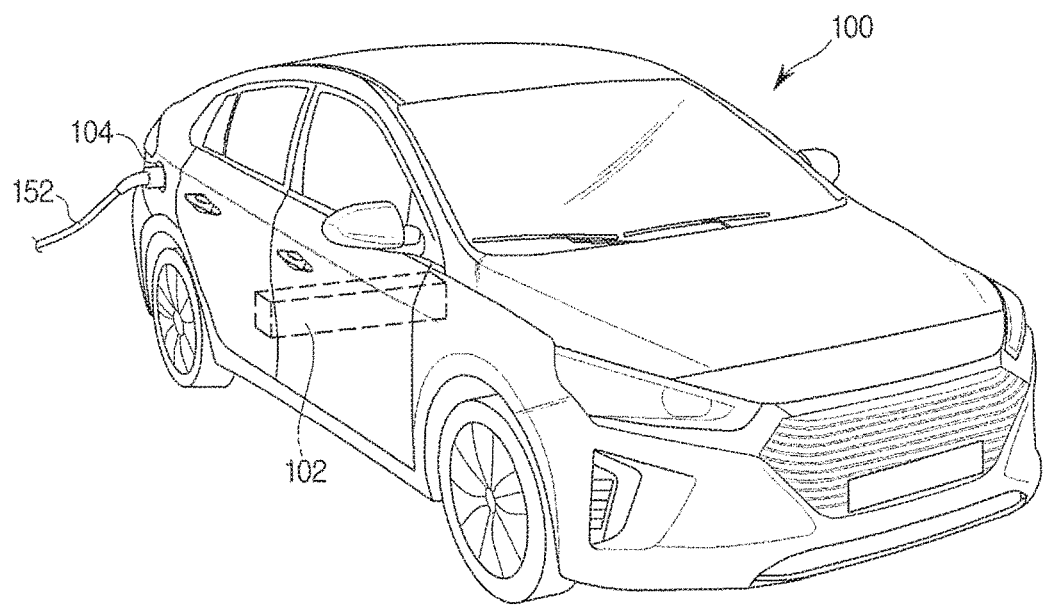
FIG. 1 shows an electric vehicle according to an embodiment of the present disclosure.

FIG. 1 shows an electric vehicle according to an embodiment of the present disclosure.

Figure 2:
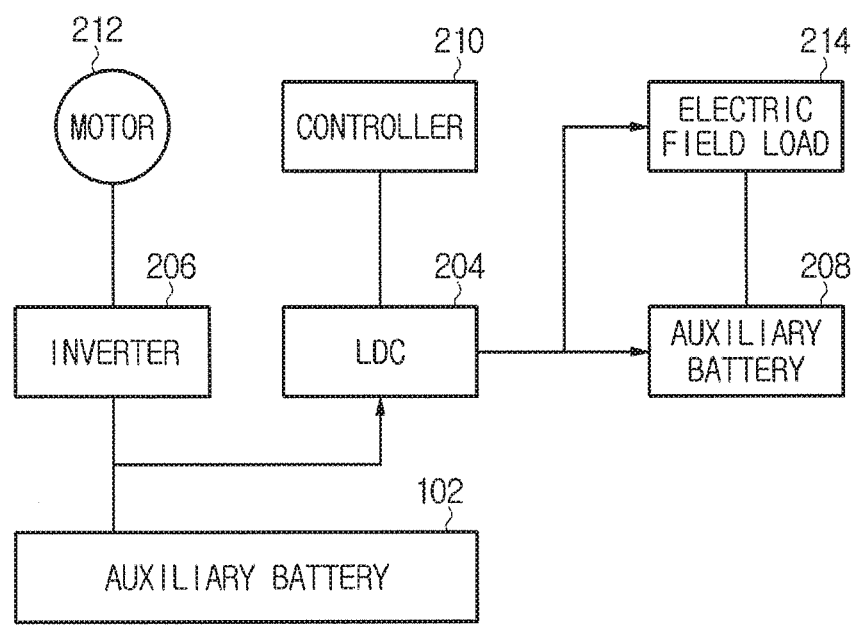
FIG. 2 is a block diagram of a power supply apparatus of an electric vehicle according to an embodiment of the present disclosure.

Referring to FIG. 1, an electric vehicle 100 may include a motor (see 212 of FIG. 2). Accordingly, the electric vehicle 100 may need a high-voltage battery to store power for driving the motor 212. An internal-combustion engine vehicle also includes an auxiliary battery (see 208 of FIG. 2) in an engine room. However, the electric vehicle 100 may require a large-capacity high-voltage battery 102 having a large size. In the electric vehicle 100 according to the present disclosure, the high-voltage battery 102 may be installed in space under a passenger seat of a second row. Electricity stored in the high-voltage battery 102 may drive the motor 212 to generate power. The high-voltage battery 102 according to the present disclosure may be a lithium battery.

The electric vehicle 100 may include a charging socket 104. The charging socket 104 may connect to a charging connector 152 installed in an external charging facility to charge the high-voltage battery 102. That is, the high-voltage battery 102 of the electric vehicle 100 may be charged by connecting the charging connector 152 installed in the external charging facility to the charging socket 104 of the electric vehicle 100.

FIG. 2 is a block diagram of a power supply apparatus of an electric vehicle according to an embodiment of the present disclosure. The power supply apparatus shown in FIG. 2 may be used to supply power to the motor 212 and an electric field load 214.

As shown in FIG. 2, the power supply apparatus of the electric vehicle 100 according to an embodiment of the present disclosure may include the high-voltage battery 102, a Low Voltage DC-DC Converter (LDC) 204, an inverter 206, an auxiliary battery 208, and a controller 210.

The LDC 204 may convert a high DC voltage of the high-voltage battery 102 into a lower DC voltage. More specifically, the LDC 204 may convert a high DC voltage of the high-voltage battery 102 into an AC voltage, step down the AC voltage through a coil, a transformer, a capacitor, etc., and then rectify the step-down voltage, thereby converting the high DC voltage to a lower DC voltage. The DC voltage stepped down by the LDC 204 may be supplied to the electric field load 214 that requires a low voltage.

A DC voltage from the high-voltage battery 102 may be converted into an AC voltage having a predetermined phase and a predetermined frequency by the inverter 206, and then supplied to the motor 212. Torque and rotational speed of the motor 212 may depend on an output voltage of the inverter 206. The controller 210 may control overall operations of the power supply apparatus.

Figure 3:
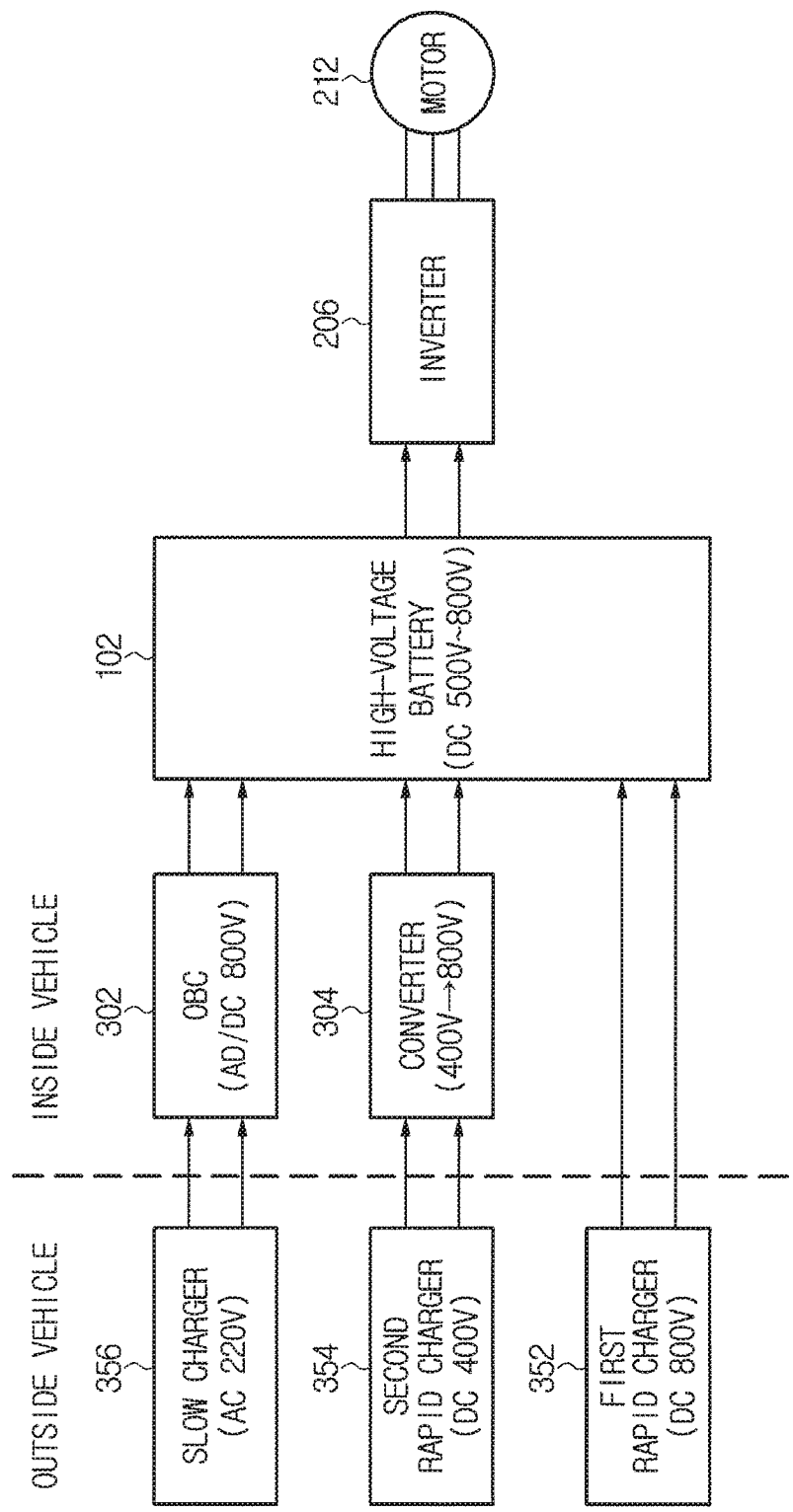
FIG. 3 is a block diagram of a charging apparatus of an electric vehicle according to an embodiment of the present disclosure.

FIG. 3 is a block diagram of a charging apparatus of an electric vehicle according to an embodiment of the present disclosure.

In order to charge the high-voltage battery 102 of the electric vehicle 100, various kinds of external chargers including a first rapid charger 352, a second rapid charger 354, and a slow charger 356 may be used. The high-voltage battery 102 may have a charging voltage of 500V to 800V.

The first rapid charger 352 may charge the high-voltage battery 102 with a first voltage (for example, a high DC voltage of 800V). The first rapid charger 352 may convert commercial AC power into a DC voltage of 800V, and supply the DC voltage of 800V to the electric vehicle 100.

The second rapid charger 354 may charge the high-voltage battery 102 with a second voltage (for example, a DC voltage of 400V) that is lower than the first voltage of 800V. The second rapid charger 354 may convert the commercial AC power into a DC voltage of 400V, and supply the DC voltage of 400V to the electric vehicle 100.

The slow charger 356 may supply the commercial AC power as it is to the electric vehicle 100. The AC power supplied through the slow charger 356 may be converted into a DC voltage of a predetermined level in the electric vehicle 100.

In the electric vehicle 100, an on-board charger (OBC) 302 and a converter 304 may be involved in charging the high-voltage battery 102.

The on-board charger 302 called OBC may convert the commercial AC power supplied from the slow charger 356 into a DC voltage of 800V so as to charge the high-voltage battery 102. While the first rapid charger 352 and the second rapid charger 354 convert an AC voltage into a DC voltage and supply the DC voltage to the electric vehicle 100, the slow charger 356 may supply commercial AC power as it is to the electric vehicle 100. The AC voltage supplied from the slow charger 356 may be converted into a DC voltage by the on-board charger 302 in the electric vehicle 100, and then used to charge the high-voltage battery 102.

When a voltage supplied from an external charger is too low to charge the high-voltage battery 102, the converter 304 may boost the voltage supplied from the external charger to a high level enough to charge the high-voltage battery 102. As shown in FIG. 3, if the high-voltage battery 102 has a very high charging voltage of 500V to 800V, the second rapid charger 354 of providing a DC voltage of 400V cannot charge the high-voltage battery 102 of the electric vehicle 100. In this case, according to the present disclosure, the converter 304 (that is, a boosting converter) for boosting a DC voltage of 400V to 800V may be used to boost the voltage of 400V supplied from the second rapid charger 354 to 800V. The voltage boosted by the converter 304 may be used to charge the high-voltage battery 102.

A DC voltage of 800V supplied from the first rapid charger 352 may be provided as it is to the high-voltage battery 102. Since the high-voltage battery 102 has a charging voltage of 500V to 800V, the DC voltage of 800V supplied from the first rapid charger 352 can be used to charge the high-voltage battery 102 without having to be boosted.

Figure 4:
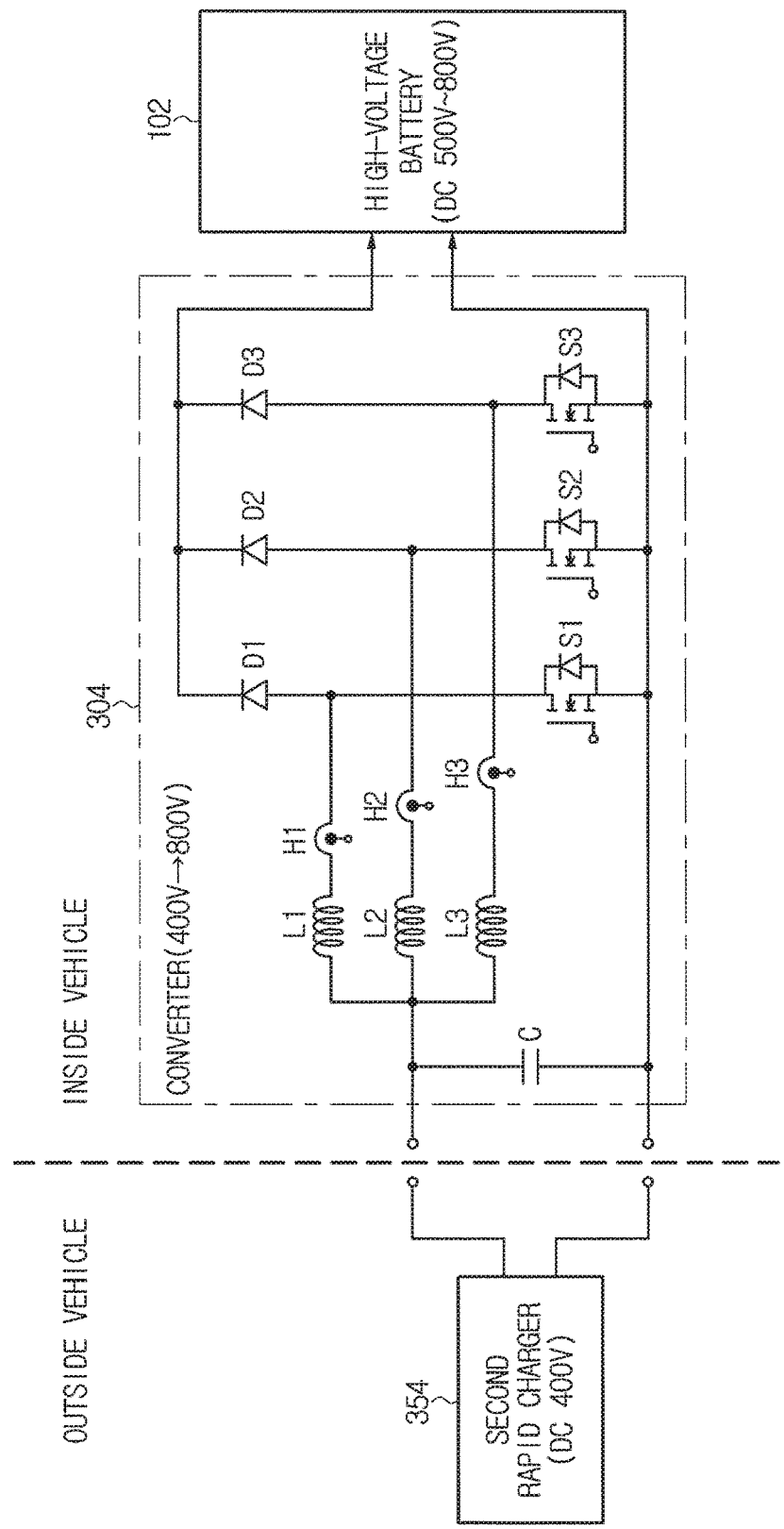
FIG. 4 shows a first embodiment of a charging apparatus of an electric vehicle according to the present disclosure.

FIG. 4 shows a first embodiment of a charging apparatus of an electric vehicle according to the present disclosure. A converter 304 shown in FIG. 4 may boost, like the converter 304 of FIG. 3, a DC voltage of 400V supplied from the second rapid charger 354 outside the electric vehicle 100 to 800V so as to charge the high-voltage battery 102.

A capacitor C connected in parallel to input terminals of the converter 304 may remove ripples of a DC voltage that is input to the converter 304.

A combination of inverters L1, L2, and L3, diodes D1, D2, and D3, and switches S1, S2, and S3 may constitute a boost circuit to boost an input voltage of 400V to generate an output voltage of 800V. The inverter L1, the diode D1, and the switch S1 may form a first group to boost an input voltage. That is, when the switch S1 is in a turned-off state, current may flow to the inductor L1 to store energy. In this state, if the switch S1 is turned on, current may no longer flow to the inductor L1 so that the energy stored in the inductor L1 is transferred to the high-voltage battery 102 through the diode D1. An output voltage of the converter 304 may be always higher than an input voltage of the converter 304. Further, the inverter L2, the diode D2, and the switch S2 may form a second group, and the inverter L3, and the diode D3, and the switch S3 may form a third group. The second and third groups may operate in the same manner as the first group of the inverter L1, the diode D1, and the switch S1.

The characteristics of the converter 304 are shown in FIGS. 5A-5D.

FIGS. 5A-5D are graphs showing electrical characteristics of a converter according to an embodiment of the present disclosure. FIGS. 5A-5C represent signals for controlling on/off operations of the switches S1, S2, and S3, respectively, and FIG. 5D represents current flowing through the inductors L1, L2, and L3. When the switches S1, S2, and S3 are turned on/off according to the control signals shown in FIGS. 5A-5C, the inductors L1, L2, and L3 may show current characteristics shown in FIG. 5D. Due to the current characteristics of the inductors L1, L2, and L3 as shown in FIG. 5D, the converter 304 may boost an input voltage.

Figure 6:
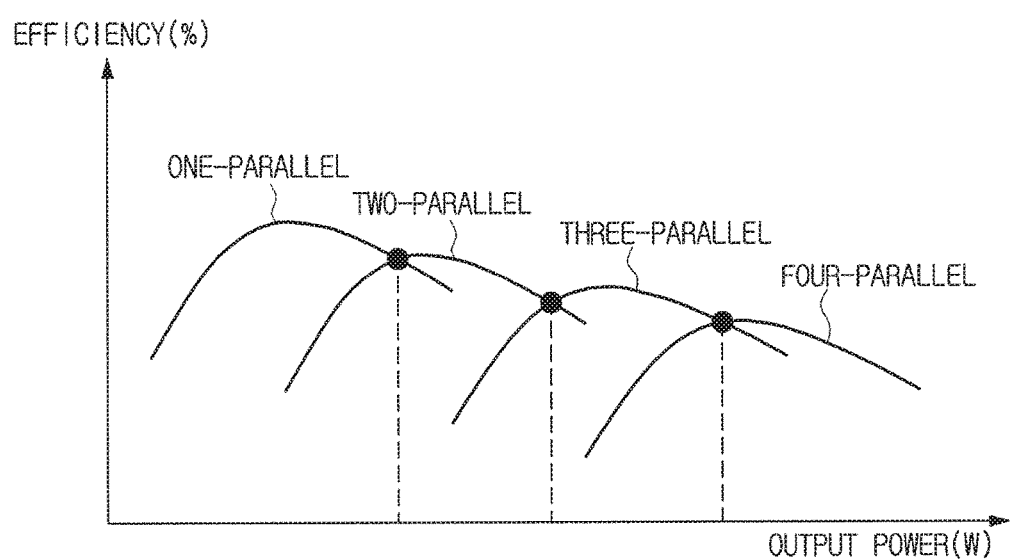
FIG. 6 is a graph showing a relation of efficiency to power of the converter shown in FIG. 4.

FIG. 6 is a graph showing a relation of efficiency to power of the converter shown in FIG. 4.

It has been described above with reference to FIG. 4 that the first group of the inductor L1, the diode D1, and the switch S1, the second group of the inductor L2, the diode D2, and the switch S2, and the third group of the inductor L3, the diode D3, and the switch S3 are involved in boosting. That is, the three groups connected in parallel to each other may be involved in boosting. By selectively operating some or all of the three groups connected in parallel to each other according to desired power, it is possible to operate the converter 304 with high efficiency from low output power to high output power. Since the converter 304 of FIG. 4 corresponds to a three-parallel structure, one-parallel to three-parallel structures can be implemented by selectively turning on/off the switches S1, S2, and S3.

Figure 7:
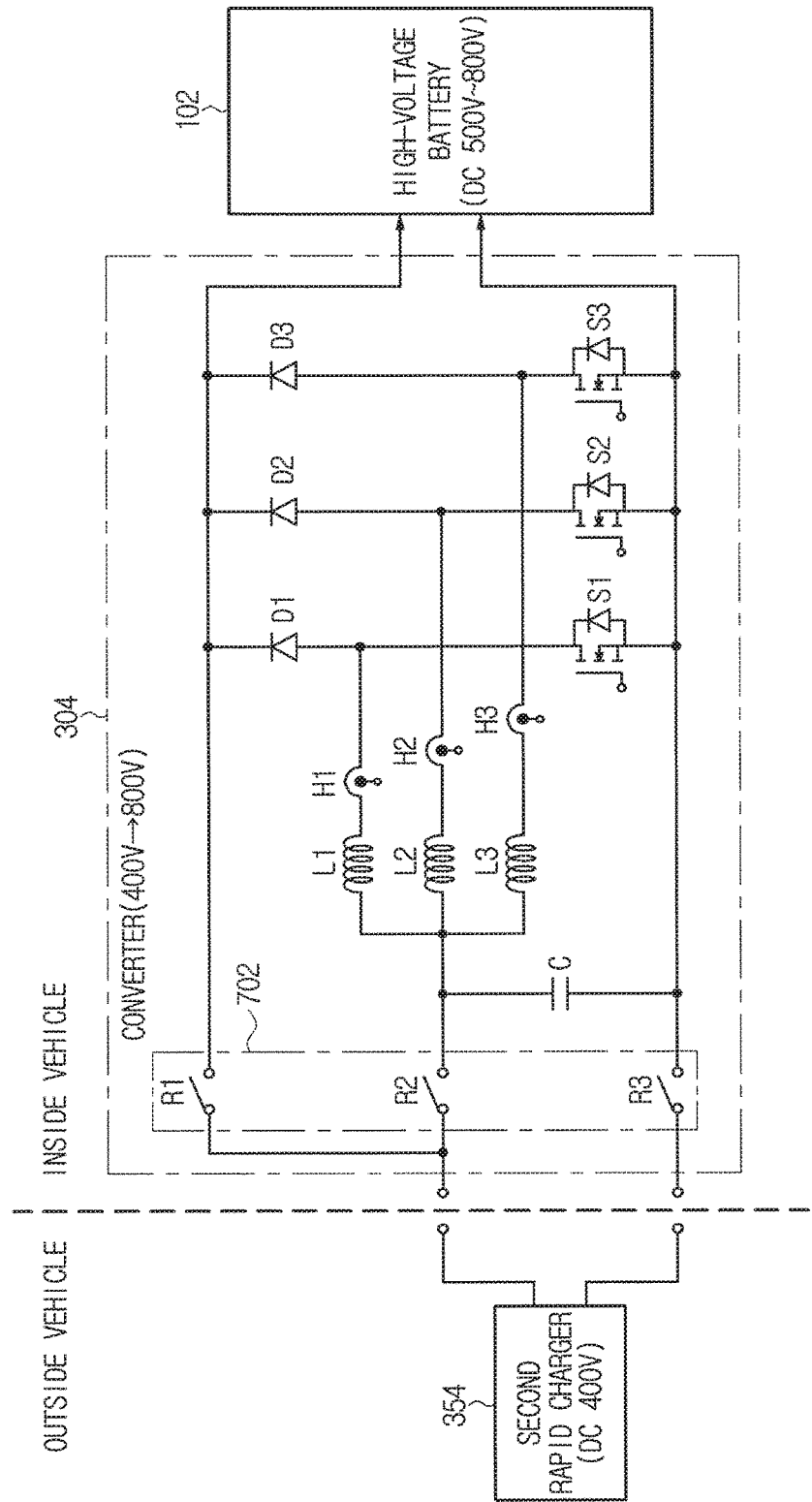
FIG. 7 shows a second embodiment of a charging apparatus of an electric vehicle according to the present disclosure.

FIG. 7 shows a second embodiment of a charging apparatus of an electric vehicle according to the present disclosure.

A basic configuration and operation of a converter 304 shown in FIG. 7 are the same as those of the converter 304 of FIG. 4 as described above. Like the converter 304 of FIG. 4, the converter 304 of FIG. 7 may boost a DC voltage of 400V supplied from the second rapid charger 354 outside the electric vehicle 100 to 800V so as to charge the high-voltage battery 102.

However, the converter 304 of FIG. 7 may further include a rapid charging switch 702 as switching means at the input side. The rapid charging switch 702 may be configured with three relays R1, R2, and R3. The rapid charging switch 702 may enable the high-voltage battery 102 to be charged, regardless of which one of the first rapid charger 352 and the second rapid charger 354 is connected to the electric vehicle 100.

For example, when the second rapid charger 354 is connected to the converter 304, the second relay R2 and the third relay R3 of the rapid charging switch 702 may be turned on, the first relay R1 of the rapid charging switch 702 may be turned off, and the converter 304 may operate. In this case, the converter 304 of FIG. 7 may operate in the same manner as the converter 304 of FIG. 4 as described above to charge the high-voltage battery 102.

When the first rapid charger 352 is connected to the converter 304, the second relay R2 and the third relay R3 of the rapid charging switch 702 may be turned off, the first relay R1 of the rapid charging switch 702 may be turned on, and the converter 304 may not operate. In this case, charging current may flow to the high-voltage battery 102 through the first relay R1. In the converter 304 of FIG. 4, current may flow through the inductors L1, L2, and L3 and the diodes D1, D2, and D3, whereas in the converter 304 of FIG. 7, current may flow to the high-voltage battery 102 directly through the first relay R1 that is turned on. Accordingly, the converter 304 of FIG. 7 can obtain higher efficiency than the converter 304 of FIG. 4 (due to a smaller number of resistor elements).

The relays R1, R2, and R3 shown in FIG. 7 may be selectively turned on and off when the vehicle 100 is in a charging mode to be involved in charging the high-voltage battery 102, and when the vehicle 100 is in a driving mode, all of the relays R1, R2, and R3 may be turned off.

Figure 8:
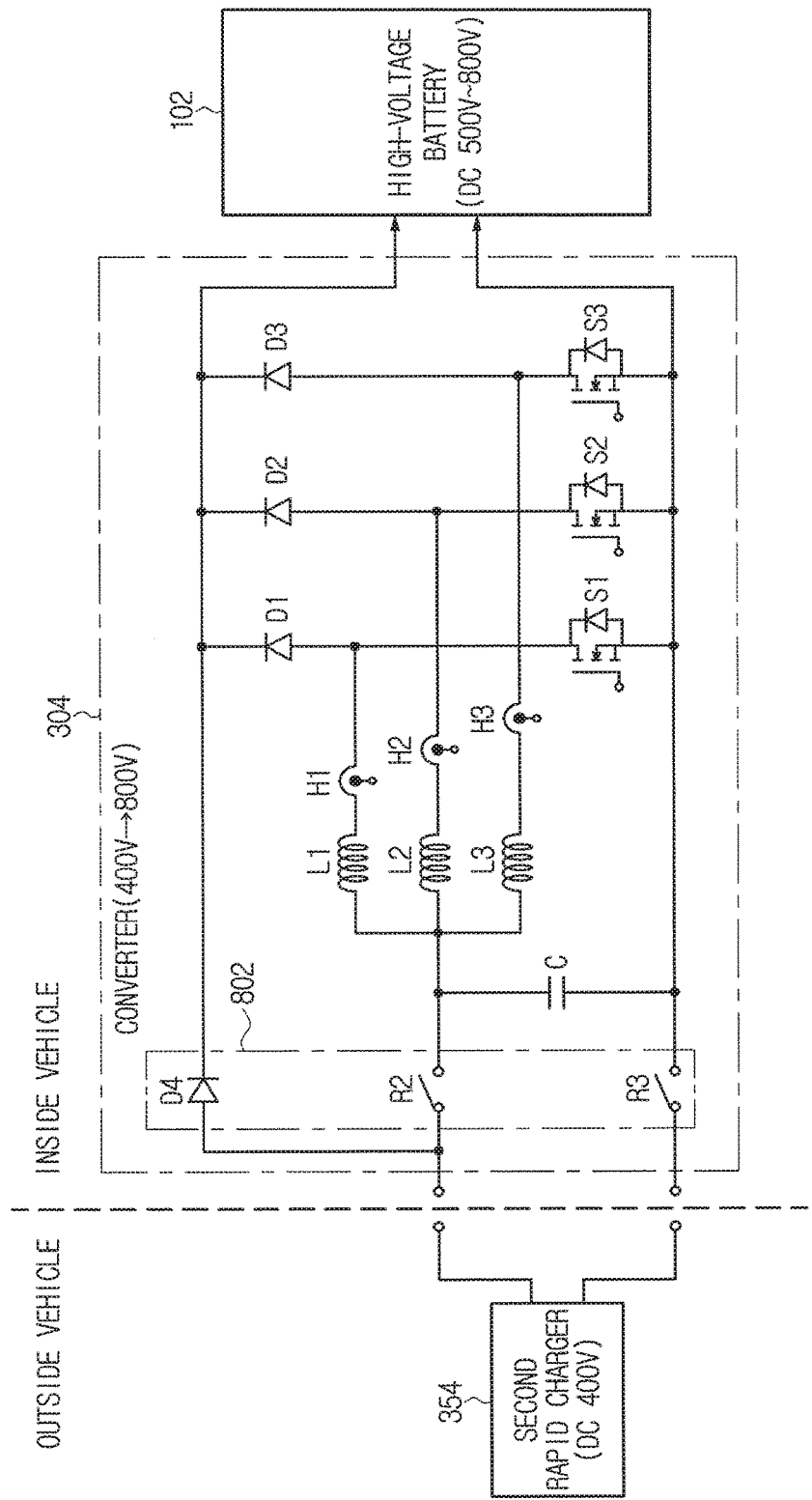
FIG. 8 shows a third embodiment of a charging apparatus of an electric vehicle according to the present disclosure.

FIG. 8 shows a third embodiment of a charging apparatus of an electric vehicle according to the present disclosure.

A basic configuration and operation of a converter 304 shown in FIG. 8 are the same as those of the converter 304 of FIG. 7 as described above. Like the converter 304 of FIG. 7, the converter 304 of FIG. 8 may boost a DC voltage of 400V supplied from the second rapid charger 354 outside the electric vehicle 100 to 800V so as to charge the high-voltage battery 102, wherein a rapid charging switch 802 provided at an input side of the converter 304 enables the high-voltage battery 102 to be charged, regardless of which one of the first rapid charger 352 and the second rapid charger 354 is connected to the electric vehicle 100.

The rapid charging switch 802 provided in the converter 304 of FIG. 8 may be configured with a diode D4, a second relay R2, and a third relay R3. Compared to the rapid charging switch 702 of FIG. 7, the rapid charging switch 802 may include the diode D4, instead of the first relay R1.

When the second rapid charger 354 is connected to the converter 304, the second relay R2 and the third relay R3 of the rapid charging switch 802 may be turned on, and then the converter 304 may operate. In this case, the converter 304 of FIG. 8 may operate in the same manner as the converter 304 of FIG. 4 described above to charge the high-voltage battery 102.

Meanwhile, when the first rapid charger 352 is connected to the converter 304, the second relay R2 and the third relay R3 of the rapid charging switch 802 may be turned off, and the converter 304 may not operate. In this case, charging current may flow to the high-voltage battery 102 through the diode D4. In the converter 304 of FIG. 4, current may flow through the inductors L1, L2, and L3 and the diodes D1, D2, and D3, whereas in the converter 304 of FIG. 8, current may flow to the high-voltage battery 102 directly through the first relay R1 that is turned on. Accordingly, the converter 304 of FIG. 8 can obtain higher efficiency than the converter 304 of FIG. 4 (due to a smaller number of resistor elements).

Particularly, since the converter 304 of FIG. 8 uses the diode D4 instead of the first relay R1, it is unnecessary to control the first relay R1, resulting in simplification of control logics.

Figure 9:
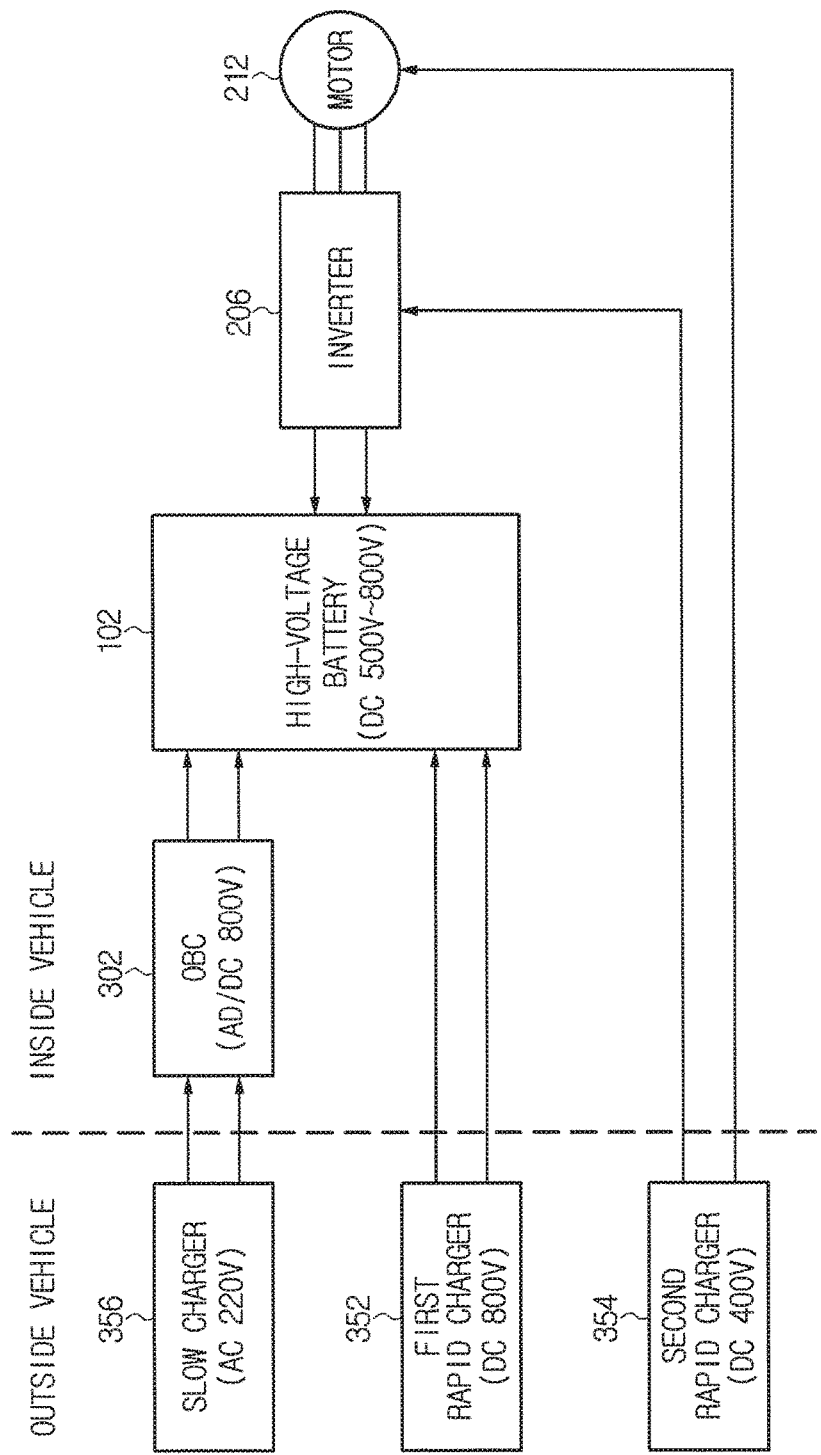
FIG. 9 is a block diagram of another type of a charging apparatus of an electric vehicle according to an embodiment of the present disclosure.

FIG. 9 is a block diagram of another type of a charging apparatus of an electric vehicle according to an embodiment of the present disclosure.

The charging apparatus shown in FIG. 9 may have characteristics that are different from those of the charging apparatus shown in FIG. 3, as follows. That is, the charging apparatus of FIG. 3 may boost a DC voltage of 400V provided from the second rapid charger 354 through the separate converter 304 so as to charge the high-voltage battery 102. In contrast, the charging apparatus of FIG. 9 may boost a DC voltage of 400V to 800V by using the motor 212 and the inverter 206 installed in the electric vehicle 100 as a converter, without including the converter 304.

As shown in FIG. 9, if the motor 212 and the inverter 206 are used as if they are a converter, the motor 212 may operate as an inductor, and the inverter 206 may operate as a diode and a switch. A DC voltage of 400V provided from the second rapid charger 354 may be provided to the inverter 206 and the motor 212. In this case, a neutral terminal of the motor 212 may be connected to the second rapid charger 354. Through a structure of the second rapid charger 354, the motor 212, and the inverter 206, as shown in FIG. 9, a DC voltage of 400V provided from the second rapid charger 354 may be boosted to a DC voltage of 800V, and the DC voltage of 800V may be used to charge the high-voltage battery 102.

Since the charging apparatus shown in FIG. 9 requires no converter, the charging apparatus can have a simple structure, and accordingly, a manufacturing cost can be reduced.

Charging by the slow charger 356 and charging by the first rapid charger 352 may be performed in the same manner as the embodiment of FIG. 3 described above. That is, commercial AC power provided from the slow charger 356 may be converted and boosted to a DC voltage of 800V by the on-board charger 302, and then used to charge the high-voltage battery 102. A DC voltage of 800V supplied from the first rapid charger 352 may be supplied as it is to the high-voltage battery 102. Since the high-voltage battery 102 has a charging voltage of 500V to 800V, a DC voltage of 800V supplied from the first rapid charger 352 can charge the high-voltage battery 102 without having to be boosted.

Figure 10:
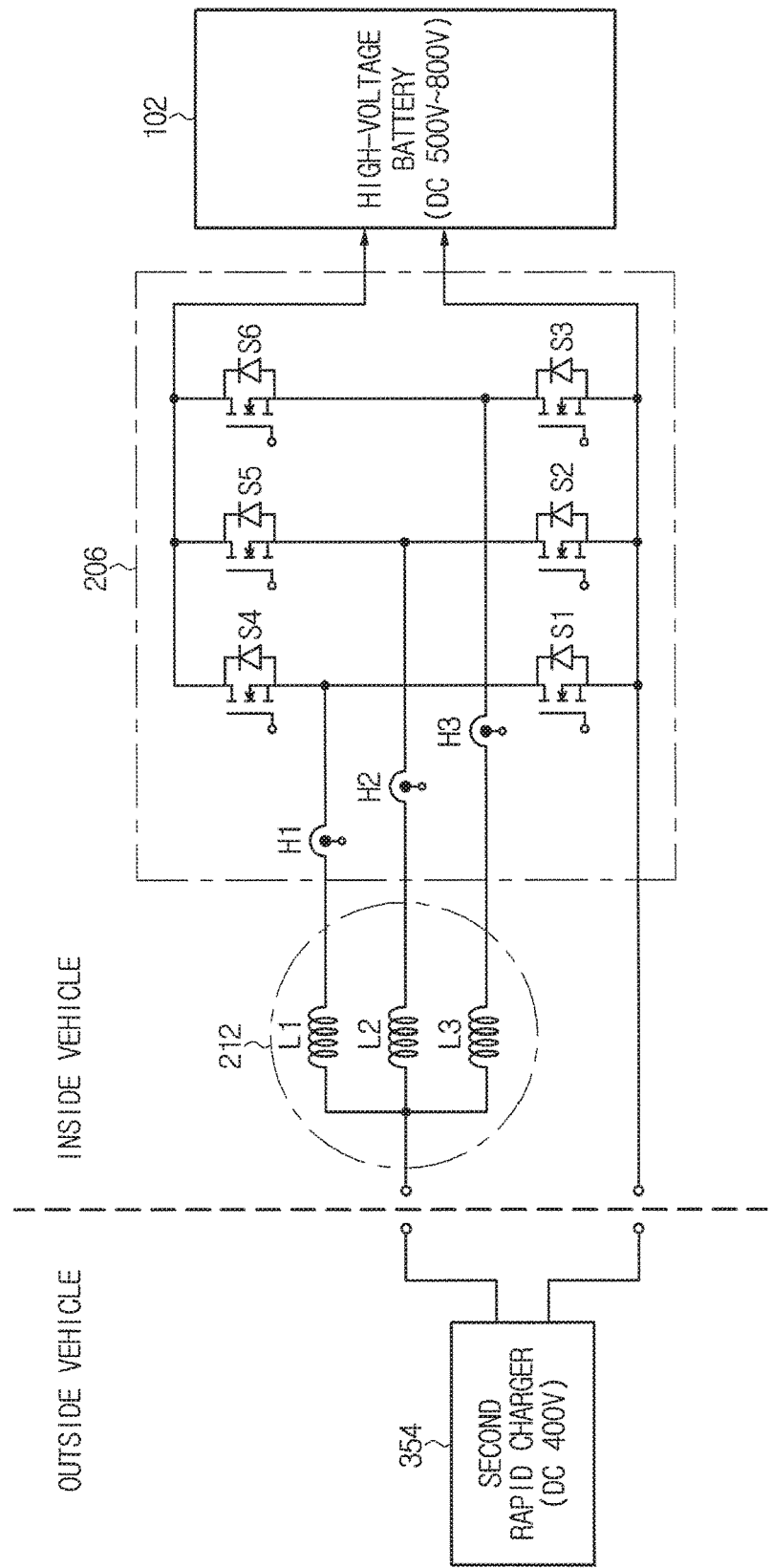
FIG. 10 shows a fourth embodiment of a charging apparatus of an electric vehicle according to the present disclosure.

FIG. 10 shows a fourth embodiment of a charging apparatus of an electric vehicle according to the present disclosure. The motor 212 and the inverter 206 of FIG. 10 may operate as the converter 304 to boost a DC voltage of 400V provided from the second rapid charger 354 outside the electric vehicle 100 to 800V so as to charge the high-voltage battery 102.

In FIG. 10, inductors L1, L2, and L3 may be coils of the motor 212. In FIG. 10, switches S1, S2, S3, S4, S5, and S6 may be components of the inverter 206. A combination of the inductors L1, L2, and L3 of the motor 212 and the switches S1, S2, S3, S4, S5, and S6 of the inverter 206 may constitute a boost circuit to boost an input voltage of 400V to generate an output voltage of 800V. The inverter L1 and the switches S1 and S4 may form a group to boost an input voltage. The inverter L2 and the switches S2 and S5 may form another group, and the inverter L3 and the switches S3 and S6 may form another group to operate in the same manner as the group of the inverter L1 and the switches S1 and S4. A pair of the switches S1, S2, and S3 and a pair of the switches S4, S5, and S6 may be turned on/off alternately. The switching operation will be described in detail with reference to FIGS. 11A-11D, below.

FIGS. 11A-11D are graphs showing electrical characteristics of the motor and the inverter according to an embodiment of the present disclosure.

FIGS. 11A-11D represent control signals for controlling on/off operations of the switches S1, S2, S3, S4, S5, and S6, and FIG. 11D represents current flowing through the inductors L1, L2, and L3. If the switches S1, S2, S3, S4, S5, and S6 are turned on/off according to the control signals as shown in FIGS. 11A-11D, the inductors L1, L2, and L3 may show current characteristics as shown in FIG. 11D. Due to the current characteristics of the inductors L1, L2, and L3 as shown in FIG. 11D, an input voltage may be boosted.

Figure 12:
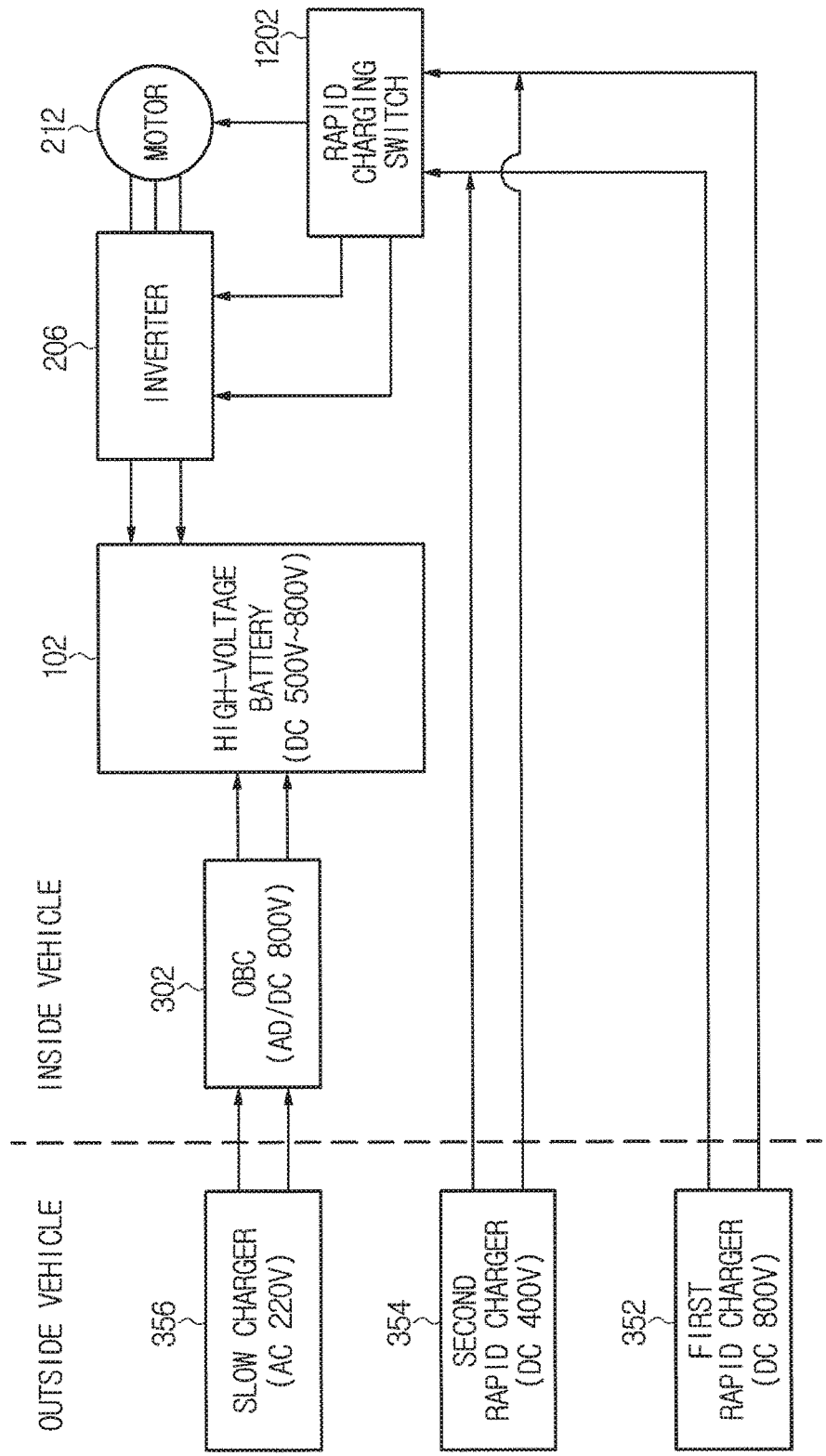
FIG. 12 is a block diagram of another type of a charging apparatus of an electric vehicle according to an embodiment of the present disclosure.

FIG. 12 is a block diagram of another type of a charging apparatus of an electric vehicle according to an embodiment of the present disclosure.

The charging apparatus shown in FIG. 12 may have characteristics which are different from those of the charging apparatus shown in FIG. 9, as follows. The charging apparatus of FIG. 9 may use no rapid charging switch, whereas the charging apparatus of FIG. 12 may use a rapid charging switch 1202.

The rapid charging switch 1202 of FIG. 12 may operate in the same manner as the rapid charging switch 702 of FIG. 7 or the rapid charging switch 802 of FIG. 8. However, unlike the embodiments of FIG. 7 or 8, the rapid charging switch 1202 may be provided as a separate component outside the inverter 206.

If the rapid charging switch 1202 is added as shown in FIG. 12, the electric vehicle 100 can obtain the same operation and effect as in the embodiments of FIGS. 7 and 8, even when the motor 212 and the inverter 206 installed in the electric vehicle 100 are used as if they are a converter.

Figure 13:
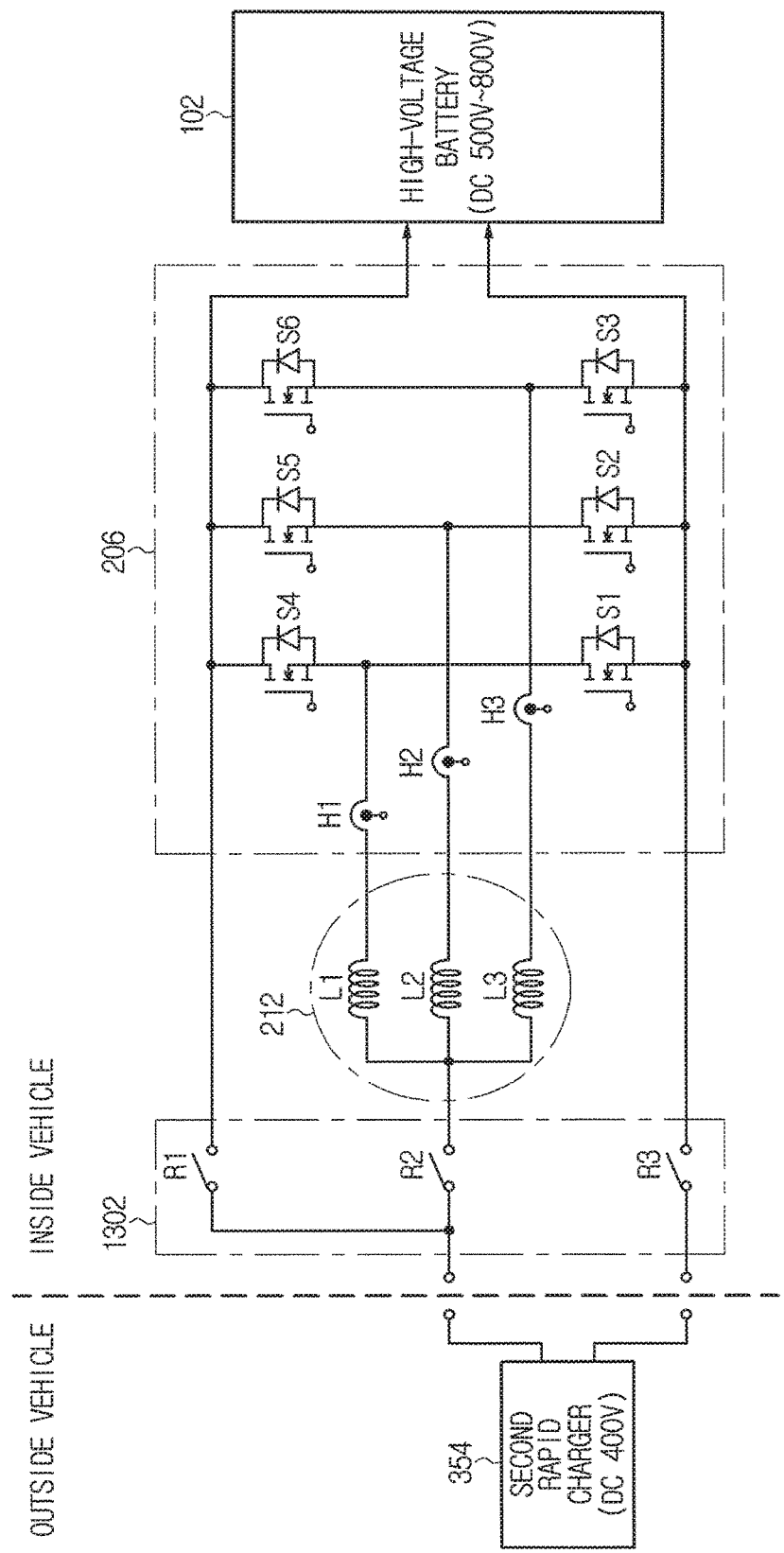
FIG. 13 shows a fifth embodiment of a charging apparatus of an electric vehicle according to the present disclosure.

FIG. 13 shows a fifth embodiment of a charging apparatus of an electric vehicle according to the present disclosure. The motor 212 and the inverter 206 of FIG. 13 may operate as the converter 304 to boost a DC voltage of 400V provided from the second rapid charger 354 outside the electric vehicle 100 to 800V so as to charge the high-voltage battery 102.

In FIG. 13, inductors L1, L2, and L3 may be coils of the motor 212. In FIG. 13, switches S1, S2, S3, S4, S5, and S6 may be components of the inverter 206. A combination of the inverters L1, L2, and L3 of the motor 212 and the switches S1, S2, S3, S4, S5, and S6 of the inverter 206 may constitute a boost circuit to boost an input voltage of 400V to generate an output voltage of 800V.

A rapid charging switch 1302 may be configured with three relays R1, R2, and R3. The rapid charging switch 1302 may enable the high-voltage battery 102 to be charged, regardless of which one of the first rapid charger 352 and the second rapid charger 354 is connected to the electric vehicle 100.

For example, when the second rapid charger 354 is connected to the rapid charging switch 1302, the second relay R2 and the third relay R3 of the rapid charging switch 1302 may be turned on, the first relay R1 of the rapid charging switch 1302 may be turned off, and the motor 212 and the inverter 206 may operate. In this case, the motor 212 and the inverter 206 of FIG. 13 may operate in the same manner as the converter 304 of FIG. 4 as described above to charge the high-voltage battery 102.

When the first rapid charger 352 is connected to the rapid charging switch 1302, the second relay R2 and the third relay R3 of the rapid charging switch 1302 may be turned off, the first relay R1 of the rapid charging switch 1302 may be turned on, and the motor 212 and the inverter 206 may not operate. In this case, charging current may flow to the high-voltage battery 102 through the first relay R1. In the embodiment of FIG. 10, current may flow through the inductors L1, L2, and L3 and the diodes D1, D2, D3, D4, D5, and D6, whereas in the embodiment of FIG. 13, current may flow directly to the high-voltage battery 102 through the first relay R1 that is turned on. Accordingly, the embodiment of FIG. 13 can obtain higher efficiency than the embodiment of FIG. 10 (due to a smaller number of resistor elements).

The relays R1, R2, and R3 shown in FIG. 13 may be selectively turned on and off when the vehicle 100 is in a charging mode to be involved in charging the high-voltage battery 102, and when the vehicle 100 is in a driving mode, all of the relays R1, R2, and R3 may be turned off.

Figure 14:
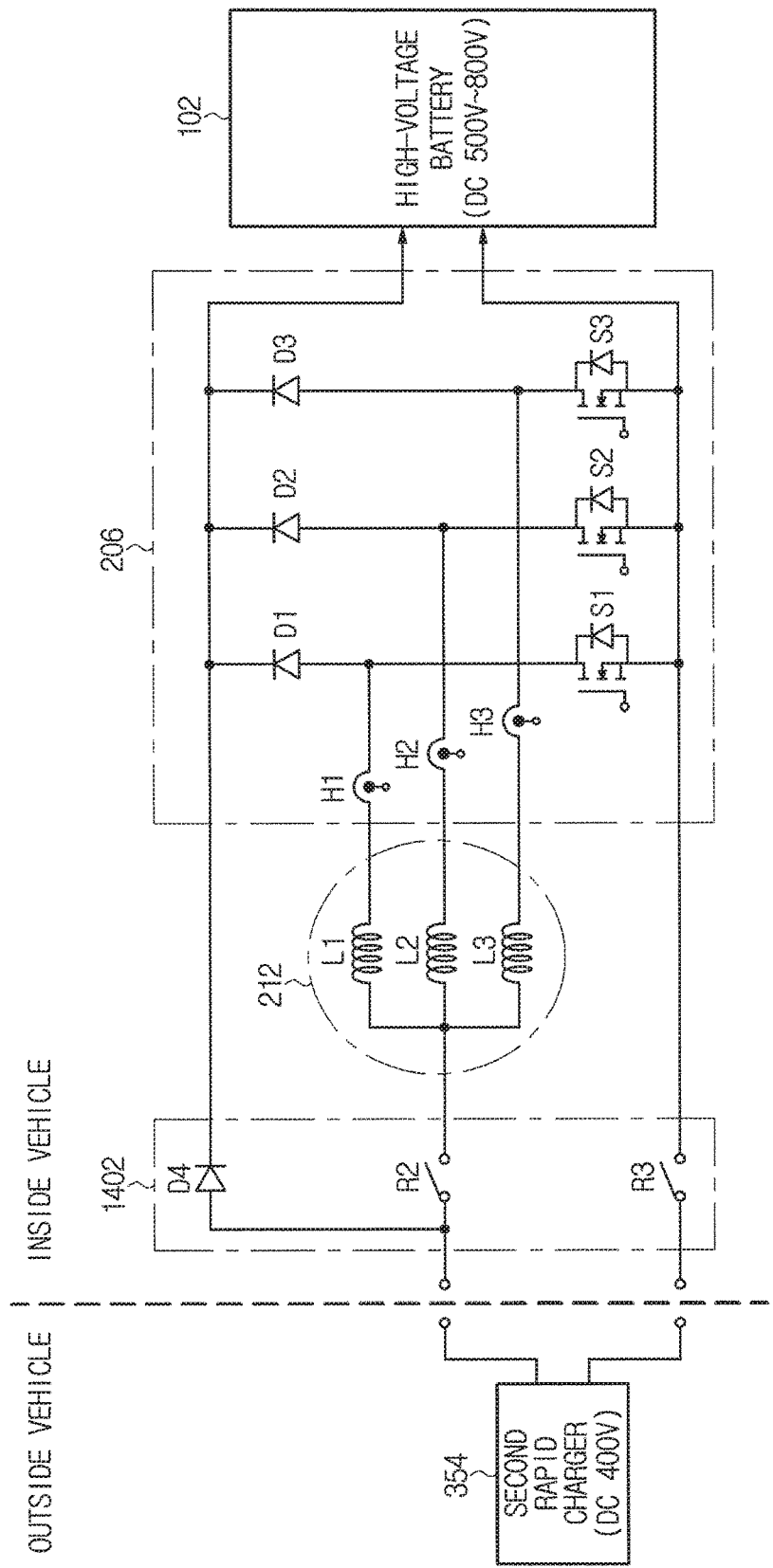
FIG. 14 shows a sixth embodiment of a charging apparatus of an electric vehicle according to the present disclosure.

FIG. 14 shows a sixth embodiment of a charging apparatus of an electric vehicle according to the present disclosure.

A basic configuration and operation of the embodiment shown in FIG. 14 are the same as those of the embodiment of FIG. 4 as described above. Like the embodiment of FIG. 13, a DC voltage of 400V supplied from the second rapid charger 354 outside the electric vehicle 100 may be booted to 800V so as to charge the high-voltage battery 102, wherein a rapid charging switch 1402 enables the high-voltage battery 102 to be charged, regardless of which one of the first rapid charger 352 and the second rapid charger 354 is connected to the electric vehicle 100.

The rapid charging switch 1402 of FIG. 14 may be configured with a diode D4, a second relay R3, and a third relay R3. Compared to the rapid charging switch 1302 of FIG. 13, the rapid charging switch 1402 of FIG. 14 may include the diode D4, instead of the first relay R1.

When the second rapid charger 354 is connected to the rapid charging switch 1402, the second relay R2 and the third relay R3 of the rapid charging switch 1402 may be turned on, and then, the motor 212 and the inverter 206 may operate. In this case, the motor 212 and the inverter 206 of FIG. 14 may operate in the same manner as the embodiment of FIG. 10 as described above to charge the high-voltage battery 102.

When the first rapid charger 352 is connected to the rapid charging switch 1402, the second relay R2 and the third relay R3 of the rapid charging switch 1402 may be turned off, and then, the motor 212 and the inverter 206 may not operate. In this case, the charging current may flow to the high-voltage battery 102 through the diode D4. In the embodiment of FIG. 10, the current may flow through the inductors L1, L2, and L3 and the diodes D1, D2, and D3, whereas in the inverter 206 of FIG. 14, current may flow directly to the high-voltage battery 102 through the first relay R1 that is turned on. Accordingly, the inverter 206 of FIG. 14 can obtain higher efficiency than the inverter 206 of FIG. 10 (due to a smaller number of resistor elements).

Particularly, since the rapid charging switch 1402 of FIG. 14 uses the diode D4 instead of the first relay R1, it is unnecessary to control the first relay R1, resulting in simplification of control logics.

The relays R1, R2, and R3 shown in FIG. 13 may be selectively turned on and off when the vehicle 100 is in a charging mode to be involved in charging the high-voltage battery 102, and when the vehicle 100 is in a driving mode, all of the relays R1, R2, and R3 may be turned off.

Figure 15:
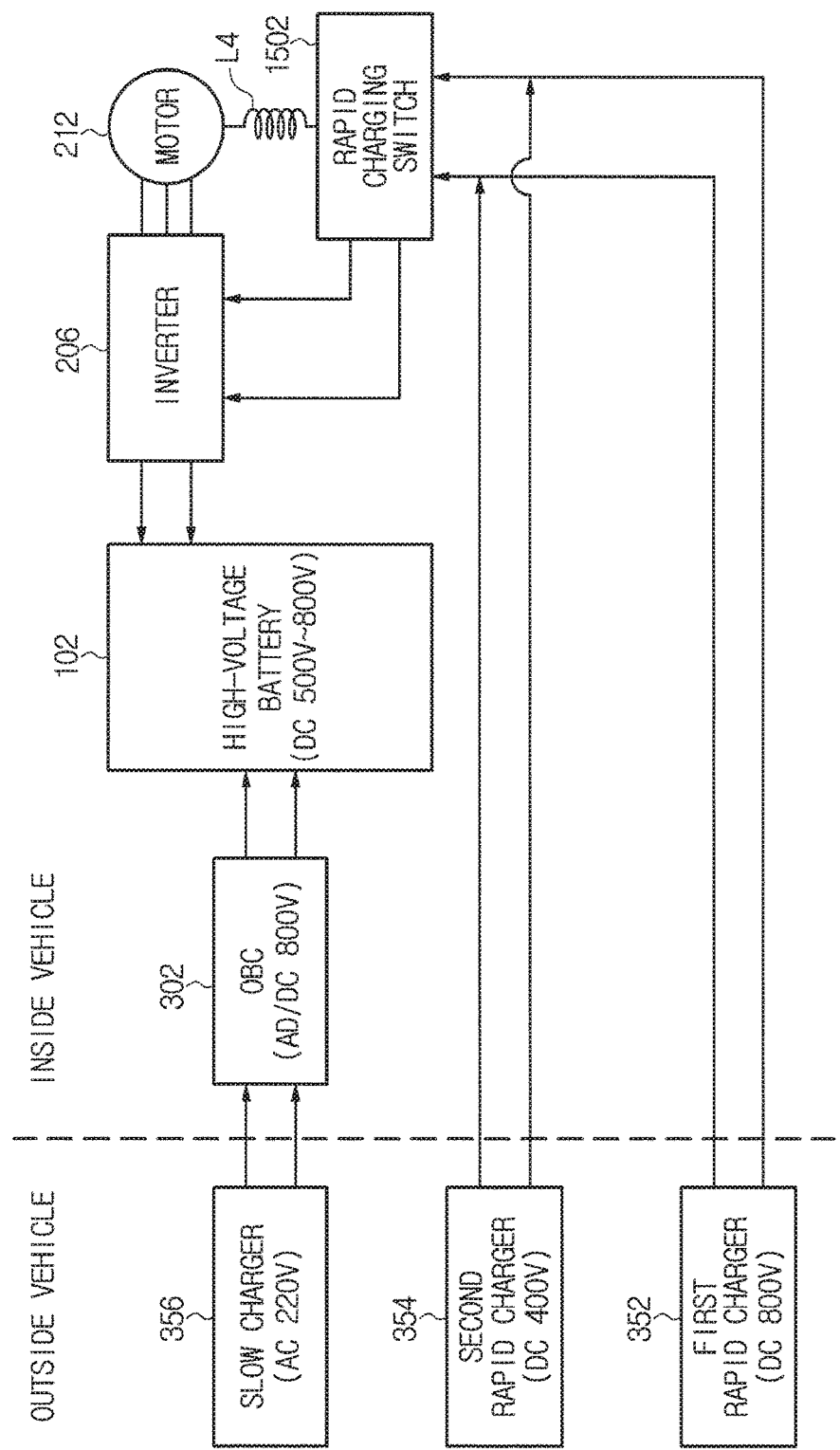
FIG. 15 is a block diagram of another type of a charging apparatus of an electric vehicle according to an embodiment of the present disclosure.

FIG. 15 is a block diagram of another type of a charging apparatus of an electric vehicle according to an embodiment of the present disclosure.

The charging apparatus shown in FIG. 15 may have characteristics which are different from those of the charging apparatus shown in FIG. 12, as follows. That is, the charging apparatus of FIG. 15 may add an external inductor L4 between a rapid charging switch 1502 and the motor 212. The external inductor L4 may be different from the inductors L1, L2, and L3 of the motor 212.

The rapid charging switch 1502 of FIG. 15 may operate in the same manner as the rapid charging switch 1202 of FIG. 12 as described above. However, ripples of current flowing to the rapid charging switch 1502 may be reduced by the external inductor L4 added between the rapid charging switch 1502 and the motor 212.

Figure 16:
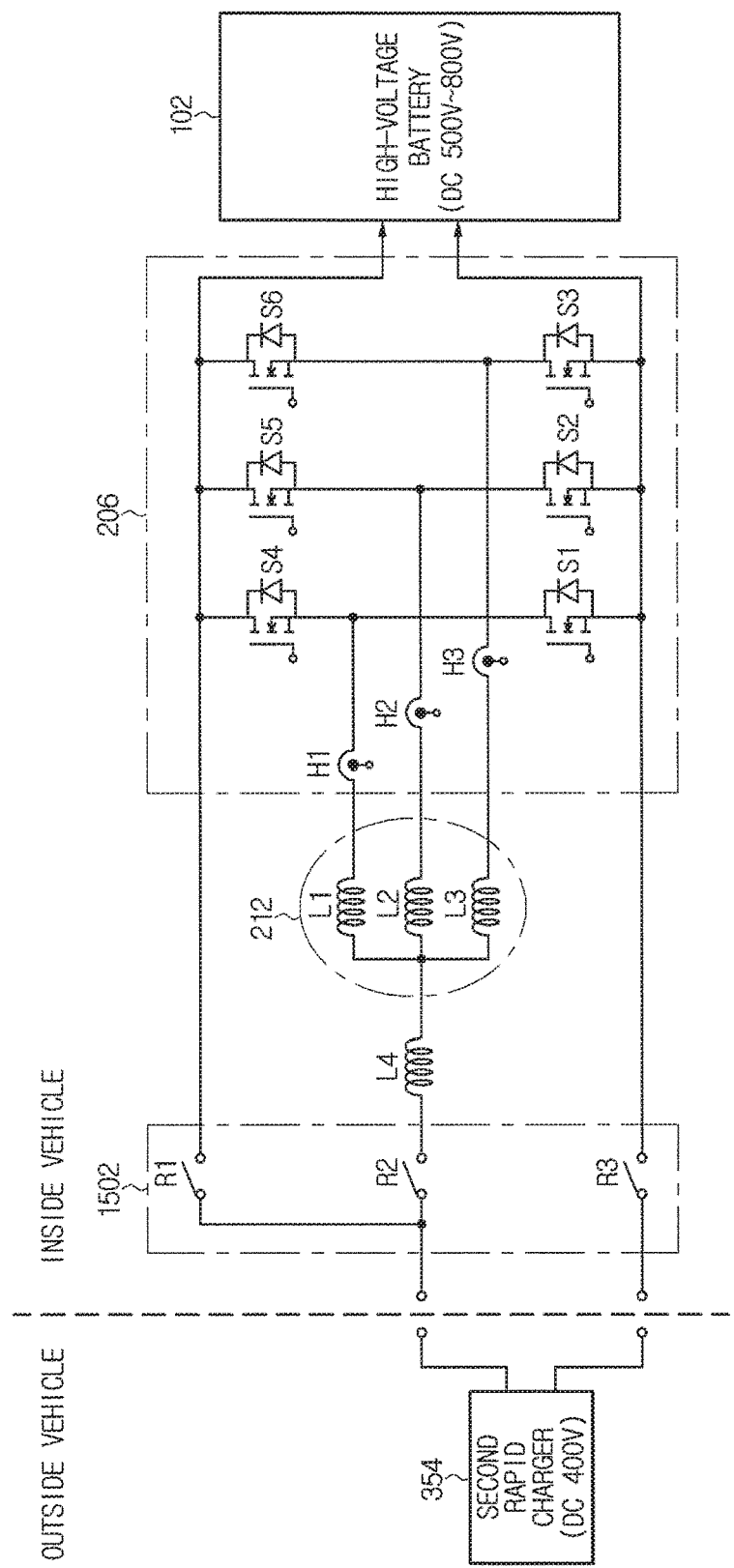
FIG. 16 shows a seventh embodiment of a charging apparatus of an electric vehicle according to the present disclosure.

FIG. 16 shows a seventh embodiment of a charging apparatus of an electric vehicle according to the present disclosure. The motor 212 and the inverter 206 of FIG. 16 may operate as the converter 304 to boost a DC voltage of 400V provided from the second rapid charger 354 to 800V so as to charge the high-voltage battery 102.

In FIG. 16, inductors L1, L2, and L3 may be coils of the motor 212. In FIG. 16, switches S1, S2, S3, S4, S5, and S6 may be components of the inverter 206. A combination of the inductors L1, L2, and L3 of the motor 212 and the switches S1, S2, S3, S4, S5, and S6 of the inverter 206 may constitute a boost circuit to boost an input voltage of 400V to generate an output voltage of 800V.

The rapid charging switch 1502 may be configured with three relays R1, R2, and R3. The rapid charging switch 1502 may enable the high-voltage battery 102 to be charged, regardless of which one of the first rapid charger 352 and the second rapid charger 354 is connected to the electric vehicle 100. The rapid charging switch 1502 may include the two relays R2 and R3 and the single diode D4, instead of the three relays R1, R2, and R3.

The relays R1, R2, and R3 shown in FIG. 16 may be selectively turned on and off when the vehicle 100 is in a charging mode to be involved in charging the high-voltage battery 102, and when the vehicle 100 is in a driving mode, all of the relays R1, R2, and R3 may be turned off.

The external inductor L4 may be connected between the second relay R2 and a neutral terminal of the motor 211. Operation of the external inductor L4 is shown in FIG. 17.

Figure 17:
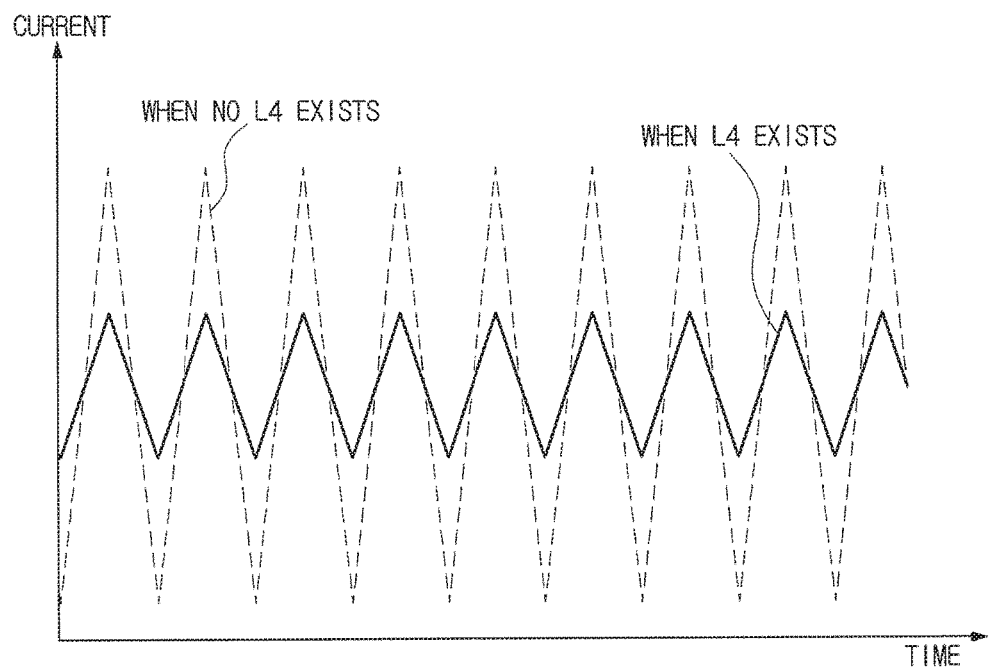
FIG. 17 is a graph for describing operation of the external inductor L4 shown in FIG. 16.

FIG. 17 is a graph for describing operation of the external inductor L4 shown in FIG. 16.

It can be seen from FIG. 17 that ripples of switch current of when the external inductor L4 exists are relatively smaller than those of switch current of when no external inductor L4 exists.

If the external inductor L4 is added, the external inductor L4 may be connected in series to the inductors L1, L2, and L3 of the motor 212 to increase total inductance. Accordingly, ripples (peak to peak) of current flowing to the switches S1, S2, S3, S4, S5, and S6 may be reduced. Reduction of ripples by the external inductor L4 may reduce conduction loss due to a reduction of Root Mean Square (RMS) current, as well as on/off switching loss of the switches S1, S2, S3, S4, S5, and S6, resulting in an improvement of power conversion efficiency and a reduction of heating of the switches S1, S2, S3, S4, S5, and S6.

Figure 18:
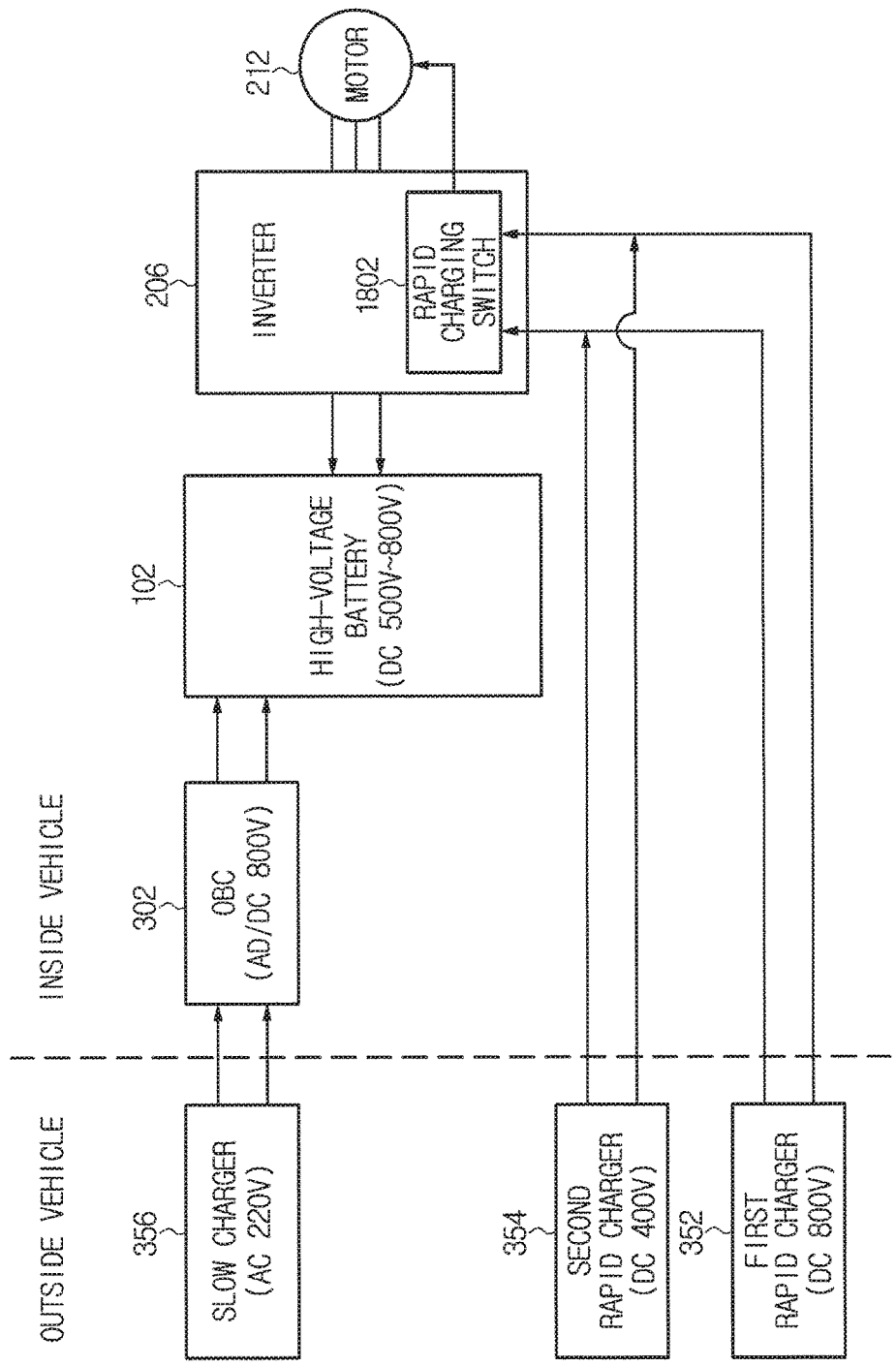
FIG. 18 is a block diagram of another type of a charging apparatus of an electric vehicle according to an embodiment of the present disclosure.

FIG. 18 is a block diagram of another type of a charging apparatus of an electric vehicle according to an embodiment of the present disclosure.

The charging apparatus shown in FIG. 18 may have characteristics that are different from those of the charging apparatus shown in FIG. 12, as follows. That is, the charging apparatus of FIG. 12 may include the rapid charging switch 1202 outside the inverter 206, whereas the charging apparatus of FIG. 18 may include a rapid charging switch 1802 inside an inverter 1806.

The rapid charging switch 1802 of FIG. 18 may operate in the same manner as the rapid charging switch 1202 of FIG. 12 as described above. However, unlike the embodiment of FIG. 12, since the rapid charging switch 1802 according to the embodiment of FIG. 18 is disposed inside the inverter 1806, the inverter 1806 and the rapid charging switch 1802 can be implemented as a single integrated module so that switching of the rapid charging switch 1802 and the inverter 1806 can be controlled by one controller (simplification of control logics).

According to an aspect of the present disclosure, by providing a converter for converting power between a charger installed in a charging facility and a battery of an electric vehicle, it is possible to achieve the compatibility between a rapid charger and a high-voltage battery.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. An electric vehicle comprising:
a battery configured to be charged with a first voltage;
a converter configured to boost, when power of a second voltage that is lower than the first voltage is received, the power of the second voltage to the first voltage, the converter further configured to transfer the first voltage to the battery so that the battery is charged with power of the first voltage; and a switch disposed at an input side of the converter, and configured to open or close a path through which the power of the second voltage is transferred to the converter and the battery, wherein the switch includes a first switch, a second switch, and a third switch, the first switch and the third switch are turned on when the power of the first voltage is received so that the power of the first voltage is transferred to the battery, the second switch and the third switch are turned on when the power of the second voltage is received so that the power of the second voltage is boosted by the converter and then transferred to the battery, and when the power of the first voltage is received, the power of the first voltage is transferred to the battery to charge the battery.

2. The electric vehicle according to claim 1, wherein the switch includes a diode, a second switch, and a third switch, the power of the first voltage is transferred to the battery through the diode and the third switch which is turned on; and the second switch and the third switch are turned on when the power of the second voltage is received so that the power of the second voltage is boosted by the converter and then transferred to the battery.

3. The electric vehicle according to claim 1, wherein the switch is selectively turned on and off in a charging mode, and in a driving mode, the switch is turned off.

4. The electric vehicle according to claim 1, wherein the switch is disposed inside the converter.

5. The electric vehicle according to claim 1, wherein the switch is disposed outside the converter.

6. An electric vehicle comprising:

a battery configured to be charged with a first voltage;

a motor configured to drive a driving wheel; and an inverter configured to convert power of the battery, and to provide the power of the battery to the motor, wherein when power of a second voltage that is lower than the first voltage is received, the motor and the inverter operate as a converter to boost the power of the second voltage to the first voltage and to transfer the first voltage to the battery, so that the battery is charged with power of the first voltage, and when the power of the first voltage is received, the power of the first voltage is transferred to the battery so that the battery is charged with the power of the first voltage.

7. The electric vehicle according to claim 6, further comprising a switch configured to open or close a path through which the power of the second voltage is transferred to the inverter and the motor.

8. The electric vehicle according to claim 7, wherein the switch includes a first switch, a second switch, and a third switch, the first switch and the third switch are turned on when the power of the first voltage is received so that the power of the first voltage is transferred to the battery through the inverter; and the second switch and the third switch are turned on when the power of the second voltage is received so that the power of the second voltage is boosted by the inverter and the motor and then transferred to the battery.

9. The electric vehicle according to claim 7, wherein the switch is selectively turned on and off in a charging mode, and in a driving mode, the switch is turned off.

10. The electric vehicle according to claim 6, wherein the switch includes a diode, a second switch, and a third switch, the power of the first voltage is transferred to the inverter through the diode and the third switch which is turned on; and the second switch and the third switch are turned on if the power of the second voltage is received so that the power of the second voltage is boosted by the inverter and the motor and then transferred to the battery.

11. The electric vehicle according to claim 10, wherein the switch includes a first switch, a second switch, and a third switch, the first switch and the third switch are turned on when the power of the first voltage is received so that the power of the first voltage is transferred to the battery through the inverter; and the second switch and the third switch are turned on when the power of the second voltage is received so that the power of the second voltage is boosted by the inverter and the motor and then transferred to the battery.

12. An electric vehicle comprising:

a battery configured to be charged with a first voltage;

a motor configured to drive a driving wheel;

an inverter configured to convert power of the battery, and to provide the power of the battery to the motor;

a switch configured to open or close a path through which power is transferred to the inverter and the motor; and an external inductor configured to connect the switch to the motor, wherein when power of a second voltage that is lower than the first voltage is received, the motor and the inverter operate as a converter to boost the power of the second voltage to the first voltage and to transfer the first voltage to the battery, so that the battery is charged with power of the first voltage, and when power of the first voltage is received, the power of the first voltage is transferred to the battery so that the battery is charged with the power of the first voltage.

13. The electric vehicle according to claim 12, wherein the switch includes a diode, a second switch, and a third switch, the power of the first voltage is transferred to the inverter through the diode and the third switch which is turned on; and the second switch and the third switch are turned on when the power of the second voltage is received so that the power of the second voltage is boosted by the inverter and the motor and then transferred to the battery.

14. The electric vehicle according to claim 12, wherein the switch is selectively turned on and off in a charging mode, and in a driving mode, the switch is turned off.

15. The electric vehicle according to claim 12, wherein the external inductor is connected to a neutral terminal of the motor.

16. An electric vehicle comprising:

a battery configured to be charged with a first voltage;

a motor configured to drive a driving wheel;

an inverter configured to convert power of the battery, and to provide the power of the battery to the motor; and a switch disposed in the inverter to be integrated into the inverter, and configured to open or close a path through which received power is transferred to the inverter and the motor, wherein when power of a second voltage that is lower than the first voltage is received, the motor and the inverter operate as a converter to boost the power of the second voltage to the first voltage, and to transfer the first voltage to the battery so that the battery is charged with power of the first voltage, and when power of the first voltage is, the power of the first voltage is transferred to the battery so that the battery is charged with the power of the first voltage.

17. An electric vehicle comprising:

a battery configured to be charged with a first voltage;

a motor configured to drive a driving wheel; and an inverter configured, to convert power of the battery, and to provide the power of the battery to the motor, wherein when power of a second voltage that is lower than the first voltage is received, the motor and the inverter operate as a converter to boost the power of the second voltage to the first voltage and to transfer the first voltage to the battery.

\* \* \* \* \*